United States Patent
Zhang et al.

(10) Patent No.: US 6,567,400 B1
(45) Date of Patent: May 20, 2003

(54) HARDWARE ASSISTED DSP DATA TRANSFER

(75) Inventors: Liping Zhang, Foster City, CA (US); Indrajit Rajeev Vergis Gajendran, Sunnyvale, CA (US)

(73) Assignee: Cisco Systems, Inc., San Jose, CA (US)

( * ) Notice: Subject to any disclaimer, the term of this patent is extended or adjusted under 35 U.S.C. 154(b) by 0 days.

(21) Appl. No.: 09/346,873

(22) Filed: Jul. 2, 1999

(51) Int. Cl.$^7$ .............................................. H04L 12/66
(52) U.S. Cl. ...................... 370/352; 370/412; 370/429
(58) Field of Search ................................ 370/352, 353, 370/363, 368, 371, 374, 378, 379, 381, 382, 395.72, 412, 429

(56) References Cited

U.S. PATENT DOCUMENTS

| | | | |
|---|---|---|---|
| 5,640,399 A | * 6/1997 | Rostoker et al. | 370/392 |
| 5,838,915 A | 11/1998 | Klausmeier et al. | |
| 5,838,994 A | 11/1998 | Valizadeh | |
| 5,970,069 A | * 10/1999 | Kumar et al. | 370/402 |
| 6,021,132 A | * 2/2000 | Muller et al. | 370/412 |
| 6,278,707 B1 | * 8/2001 | MacMillan et al. | 370/352 |
| 6,327,267 B1 | * 12/2001 | Valentine et al. | 370/466 |
| 6,351,524 B1 | * 2/2002 | Schuster et al. | 379/88.23 |
| 6,356,545 B1 | * 3/2002 | Vargo et al. | 370/355 |
| 6,389,038 B1 | * 5/2002 | Goldberg et al. | 370/471 |
| 6,400,711 B1 | * 6/2002 | Pounds et al. | 370/353 |

OTHER PUBLICATIONS

Rizzetto, D et al "A Voice over IP Service Architecture for Integrated Communications" IEEE Internet Computing, May–Jun. 1999k, vol. 3, Issue 3, pp. 53–62.*

Hamdi, M. et al "Voice Service Interworking for PSTN and IP Networks" IEEE Communications Magazine, May 1999, vol. 37, Issue 5, pp. 104–111.*

Schoen, U. et al "Convergence Between Public Switching and the Internet" IEEE Communications Magazine, Sep. 21–26, 1997, pp. 50–65.*

* cited by examiner

Primary Examiner—Hassan Kizou
Assistant Examiner—Anh-Vu H Ly
(74) Attorney, Agent, or Firm—Law Offices of Imam

(57) ABSTRACT

A network device, for establishing communication between a first communication unit and a second communication unit through a packet switching network, includes a DSP array responsive to signals having coupled thereon voice, fax or data information for digitizing the information and converting the same to packets to form digitized packets of information. The network device further includes a routing engine for transmitting the digitized packets through the packet switching network; a DSP memory coupled to the DSP array for storing digitized packets; a packets memory coupled to the routing engine for storing a plurality of digitized packets for transfer to the routing engine; and a memory interface unit coupled between the DSP memory and the packets memory for consummating the transfer of the digitized voice packets from the DSP memory to the packets memory for transfer thereof to the routing engine and accumulating a large number of the digitized packets in the packets memory prior to effectuating the transfer to the routing engine, wherein minimal intervention for transmitting the digitized packet is required by the routing engine thereby allowing the routing engine to tend to higher level tasks resulting in improved system capacity and performance.

11 Claims, 4 Drawing Sheets

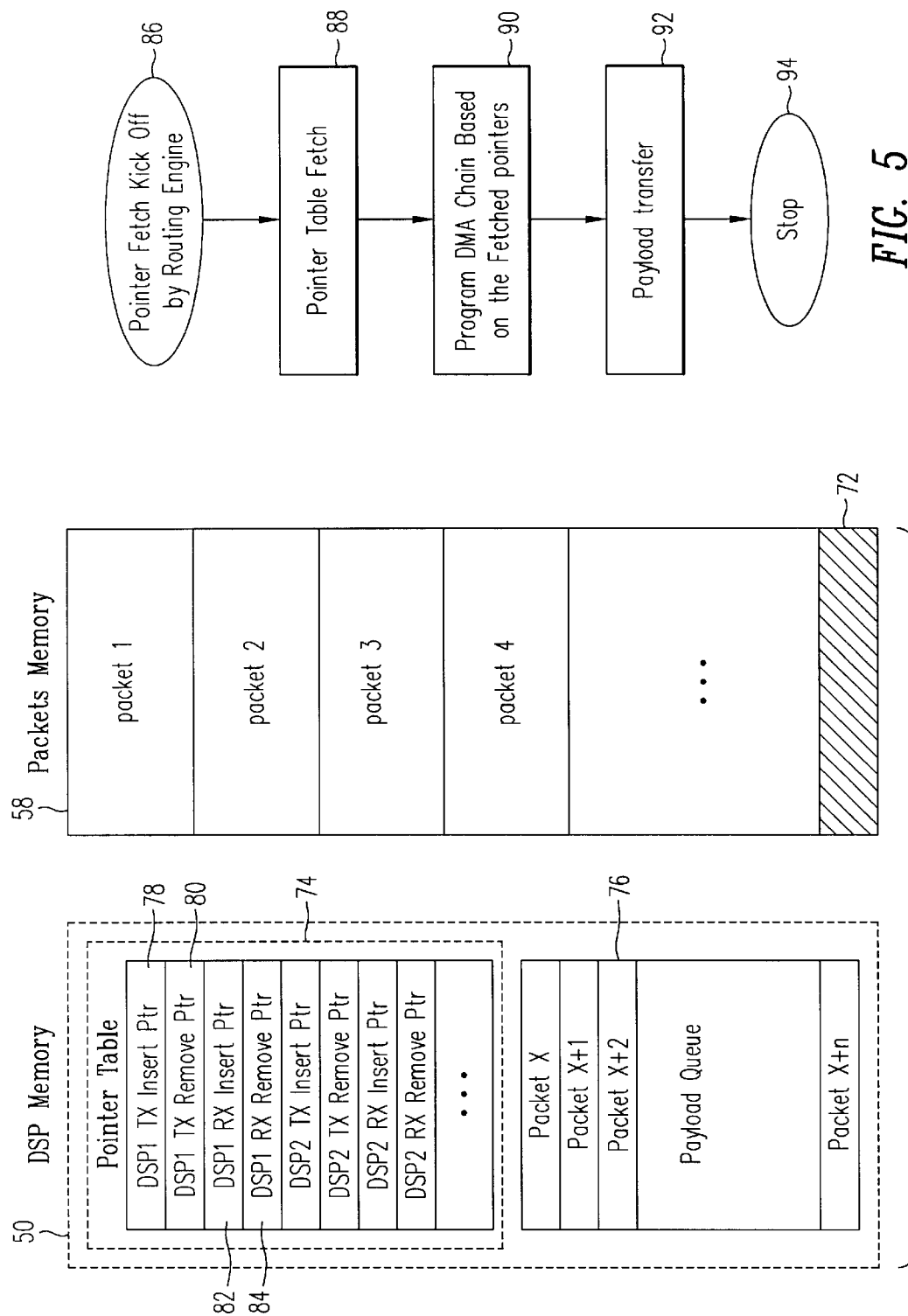

HARDWARE ASSISTED DSP DATA TRANSFER

BACKGROUND OF THE INVENTION

1. Field of the Invention

The present invention relates to transfer of voice information in a packet switching network environment and particularly to transfer of voice-over-Internet Protocol (IP) in a packet switching network environment employing Digital Signal Processors and memory units for storing voice packets to be transferred through the packet switching network.

2. Description of the Prior Art

In modern communications systems it is typical to employ large arrays of DSP (Digital Signal Processors) devices for transmission of data or voice information from one communications device to another. A DSP device is generally an integrated circuit (otherwise referred to as a chip or semiconductor) that is a specialized processor executing code (referred to as firmware or software) to rapidly and efficiently process mathematical functions such as multiply and add operations. For example, a DSP device is capable of executing a multiply and add operation in a single machine cycle (using one clock cycle), which is generally performed at a higher speed and lower cost than when implemented by a general-purpose Central Processing Unit (CPU) or processor.

A common DSP application is a modem which converts voice information, i.e. telephone calls, into digitized packets and vice versa. In this respect, generally, voice information is first digitized (converted from analog format to digital format) prior to being converted to packets. In the analog domain, signals of the type voice, fax or data may be transported. Modern DSP chips can carry multiple data or voice channels. An example of such a communications system is a RAS (Remote Access Server) where large arrays of DSP devices are employed therein implementing hundreds of modems on a single PCB (Printed Circuit Board).

In traditional communications systems, a single (primary) CPU (Central Processing Unit) communicates with a single DSP. The DSP transforms the information into packets and the CPU retrieves each packet of information from the DSP memory and stores each packet in its memory, which may be located internally or externally to the DSP chip, for transmission at a later time. Currently, this process of information retrieval is initiated whenever the DSP device receives a new packet in its memory. Subsequently, the DSP device sends an interrupt prompt over to the CPU which causes the CPU to realize that there is a new packet of information in the DSP memory. The CPU then proceeds to fetch a pointer for identifying the address or location of the new packet of information within the DSP memory. Subsequently, the CPU fetches the new packet of information from the DSP memory. In this manner, the CPU responds whenever it is interrupted by the DSP device. This manner of transporting information is commonly referred to as interrupt-driven PIO (Programmed Input/Output).

Although the PIO approach to information movement works well when the CPU has to support a few DSP devices, as the number of DSP devices increases, a problem arises with managing all of the DSP devices. It is the inventors' experience that as the number of total voice channels reaches 30 or more, excessive delay or latency develops which renders the PIO approach unsuitable for the service of voice-traffic. This is because as each of the DSP devices receives new information, it must interrupt the CPU while the CPU is busy with other high level tasks. The result may be insufficient time for PIO information movement in-and-out of each DSP device, particularly at the required information transfer rates and latency limits.

Latency is an important issue for systems involving voice communications such as modems, which often need to process multiple voice or data channels in a single chip. A single DSP chip often has throughput limitations imposed by a slow local bus interface. In addition, the interface between the CPU and the point to which information is transferred thereto, such as the Internet in a packet switching network environment, is usually much faster than the DSP interface which further decreases efficiency by requiring the CPU to wait for information to be received from the slower DSP interface.

That is, the rate at which the CPU operates and accesses its local memory for transfer of packets is much faster than the rate at which the DSP device operates and accesses its local memory, which results in a latency issue. For example, voice information is transmitted onto voice channels that are received by DSP devices at a rate of 64 Kbits/sec because each voice channel transfers information to the DSP device at such rate, whereas, voice information transmitted from the CPU (generally through an Ethernet connection) is transferred at 100 Mbits/sec. The need to service hundreds or thousands of slow data streams leads to the problem that the CPU will have in terms of servicing all of the DSP devices. The more DSP devices employed, the more exacerbated this problem becomes.

An alternate approach to PIO data movement which is popularly used is to employ one or more DMA (Direct Memory Access) controllers to transfer data between the DSP memory and the CPU memory, the latter referred to herein as packet memory. In this approach, the DMA controller rather than the CPU moves data from the DSP memory to the packet memory. However, this approach has the same problem as the previous one in that for a few DSPs it is feasible to use a DMA controller for data movement but for a large array of DSPs, containing, for example, more than 96 such units, the exclusive use of DMA controller with no added intelligence is inefficient.

Furthermore, the traditional low-cost DSP does not include a DMA controller. A third alternative might be to implement secondary CPUs for every few DSPs only to handle the low-level data movement, and this is undesirable because it is expensive.

In view of the above, it is desirable to develop a DMA-based architecture wherein the process of moving data in and out of each DSP is made intelligent so that for a system involving a large array of DSPs, which can potentially handle hundreds of voice calls, data is transferred at appropriate rates between the DSP memory and the packet memory with no the CPU to transfer information on a packet-by-packet basis thereby allowing the CPU to offload a substantial burden involving data movement to leave enough time for other high-level tasks.

SUMMARY OF THE INVENTION

Briefly, a network device for establishing communication between a first communication unit and a second communication unit through a packet switching network includes a DSP array responsive to signals having coupled thereon voice, fax or data information for digitizing the information and converting the same to packets to form digitized packets of information. The network device further includes a routing engine for transmitting the digitized packets through the packet switching network; a DSP memory coupled to the DSP array for storing said digitized packets; a packets memory coupled to the routing engine for storing a plurality of said digitized packets for transfer thereof to the routine engine; and a memory interface unit coupled between the DSP memory and the packets memory for consummating the transfer of the digitized voice packets from the DSP memory to the packets memory for transfer thereof to the routing engine and accumulating a large number of the digitized packets in the packets memory prior to effectuating the transfer to the routing engine, wherein minimal intervention for transmitting the digitized packet is required by the routing engine thereby allowing the routing engine to tend to higher level tasks resulting in a reduction in voice latency and increased overall system efficiency.

The foregoing and other objects, features and advantages of the invention will be apparent from the following detailed description of the preferred embodiments which made reference to the several figures of the drawing.

IN THE DRAWINGS

FIG. 1 shows a communication system 10 including network devices 22 and 30 in accordance with an embodiment of the present invention.

FIG. 2 shows, in block diagram form, structures included within the network device 22 of FIG. 1 including a memory interface unit 54 in accordance with an embodiment of the present invention.

FIG. 3 illustrates, in block diagram form, structures included within the memory interface unit 54 of FIG. 2 including a DSP memory unit 50 and a packets memory unit 58.

FIG. 4 shows an example of the organization of information stored within the DSP memory unit 50 of FIG. 3.

FIG. 5 depicts the various steps performed by the CPU 65 (shown in FIG. 2) in accordance with an embodiment of the present invention.

DETAILED DESCRIPTION OF THE PREFERRED EMBODIMENTS

Figure 1:
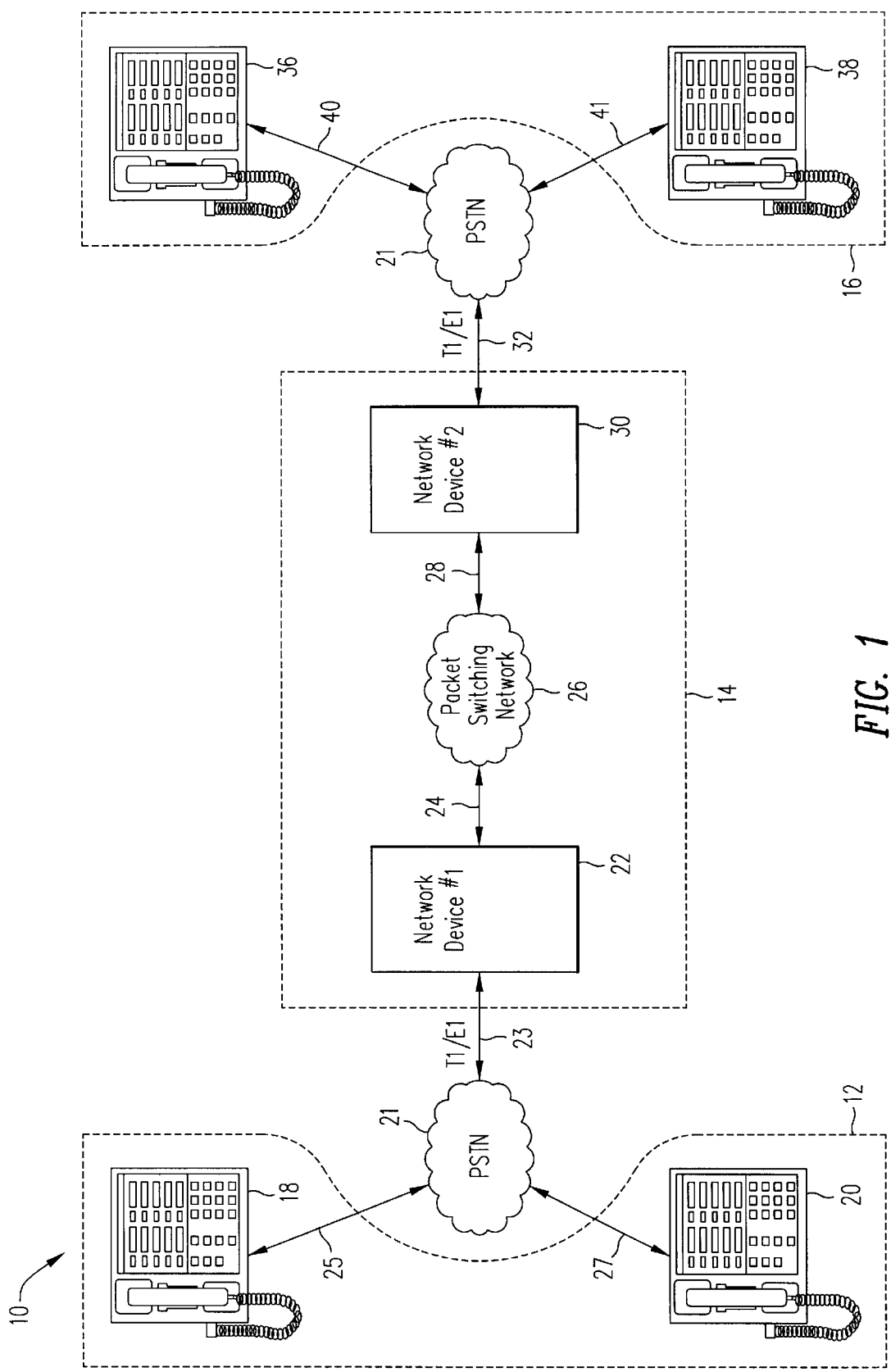

Referring now to FIG. 1, an embodiment of the present invention is shown to include a communication system 10 including a first telephone unit 12, a message transferring system 14 and a second telephone unit 16 in accordance with the present invention. The first telephone unit 12 includes telephone devices 18 and 20 and the second telephone unit 16 includes telephone devices 36 and 38. While each telephone unit in FIG. 1 includes two telephone devices, in alternative embodiments, any number of telephone devices may be employed. In fact, typically, there are many telephone devices within each group of telephones or telephone unit.

In FIG. 1, the message transferring system 14 is shown to include a first network device 22 and a second network device 30. The first network device 22 is coupled on one side to the PSTN (Public Switching Telephone Network) 21 and on another side to the network device 30 through a packet switching network 26, such as the Internet. Information transferred through the Internet is transmitted using a well-known and standardized communication protocol, the Internet Protocol (IP). The first network device 22 is coupled to the PSTN 21 through a transmission line 23. In one embodiment of the present invention, the transmission line 23 is a T1 or E1 type of transmission channel—a T1 channel carries 24 telephone lines and an E1 carries 32 telephone lines. While telephone devices are shown to be coupled onto the PSTN 21, information such as voice, fax or data may be coupled to the latter for transfer onto the message transferring unit 14. Similarly, the second network device 30 is coupled to the PSTN 21 through a transmission line 32, which also may be a T1, E1, ATM-OC3 or T3 type of transmission channel or other types of channels recognized and employed by the industry. In one embodiment of the present invention, the network devices 22 and 30 are access servers.

An access server transfers information between the PSTN, which is Time Division Multiplexed (TDM) environment, and a packet switching network, one that is typically based on IP (Internet Protocol). It should be noted that the present invention may be used in other types of packet switching networks. Some examples of such networks are IPX, Appletalk, etc. An access server can be thought of as essentially a specialized type of router having a T1/E1 controller card. The T1/E1 controller card includes hardware for multiplexing and de-multiplexing Time Division Multiplexed (TDM) signals coupled onto T1 or E1 lines. That is, the TDM hardware separates the calls that are coupled onto a single PSTN trunk, based upon assigned time slots, into multiple individual calls. Routers direct information, in the form of packets, through a packet switching network by selecting a particular path that each packet of information takes to get from one communication or network device to another. An example of an access server is the AS5800 model of products developed and manufactured by Cisco Systems, Inc. of San Jose, Calif.

The first network device 22 is coupled to the packet switching network 26 through a communication link 24 and the second network device 30 is coupled to the packet switching network 26 through a communication link 28. In one embodiment of the present invention, the communication links 24 and 28 are ethernet connections to the first and second network devices. That is, the first and second network devices may communicate over any private ethernet connection or via the Internet and other like media.

Telephone device 18 is coupled to the PSTN 21 through a telco telephone line 25 and the telephone device 20 is coupled to the PSTN 21 through a telco telephone line 27. The telephone device 36 is coupled to the PSTN 21 through the telco telephone line 40 and the telephone device 38 is coupled to the PSTN 21 through a telco telephone line 41. The telephone devices of the telephone unit 12 are in communication with the telephone devices of the telephone unit 16 through the message transferring system 14. Bi-directional arrows shown in FIG. 1, representing the lines 25, 27, 23, 24, 28, 32, 40 and 41, indicate that the path of communication between the telephone units 12 and 16 is bi-directional, i.e., users of the telephone devices 36 and 38 could originate telephone calls and the users of the telephone devices 18 and 20 could receive the calls and alternatively, users of the telephone devices 18 and 20 may initiate calls and users of the telephone devices 36 and 38 may receive the calls. Although 26 is shown to be the Internet in this embodiment of the present invention, in fact it could be any corporate internal Internet Protocol (IP) network. The latter however, has recently found to offer a good transport medium due to its better controllable ability of service.

In prior art systems, particularly prior to the advent of the Internet and its use for transmission of voice information, the message transferring system 14 including the network devices 22 and 30 and the network 26 is absent. Accordingly, when users of the telephone devices 18 and 20 originate calls, the telephone devices 18 and 20 are connected to the telephone devices 36 and 38 receiving the calls through a PSTN, such as 21. In such cases, voice calls are transmitted through communication lines in analog format with each PSTN receiving hundreds of calls from telephone users—such as users of the telephone devices 18 and 20—and each PSTN routing the calls to either another PSTN or directly to many other telephone users—such as users of the telephone devices 36 and 38.

However, in accordance with the present invention, in FIG. 1, the calls are shown to go through the message transferring system 14 which indicates that the calls are transmitted through the network 26. This is accomplished by converting the voice calls from analog format to digitized packets for transmission over the network 26. It is in the network devices 22 and 30 that such a conversion takes place. Namely, the voice calls, being in the analog format, are transmitted from the PSTN 21 to the network devices 22 through the line 23. The network device 22 then converts the voice calls to digitized packets for transmission thereof over the network 26 to the network device 30. The network device 30 converts the digitized packets back into analog format suitable for transmission to the PSTN 21 which in turn distributes the calls to respective destination, such as the telephone devices 36 and 38. The PSTN 21 is generally locally situated with respect to the telephone unit 12 and the PSTN 21 is locally situated with respect to the telephone unit 16.

Transmission of phone calls pursuant to that shown in FIG. 1 is generally referred to as voice-over-IP (Internet Protocol) indicating that voice information is converted to digitized packets and carried over the Internet in lieu of traditional ways of transmission where the message transferring system 14 is absent. In voice-over-IP method of transmission, the message transferring system 14 is transparent to telephone users so that from the user's perspective the phone connection is like a regular telephone call carrying voice information from one user to another.

Figure 2:
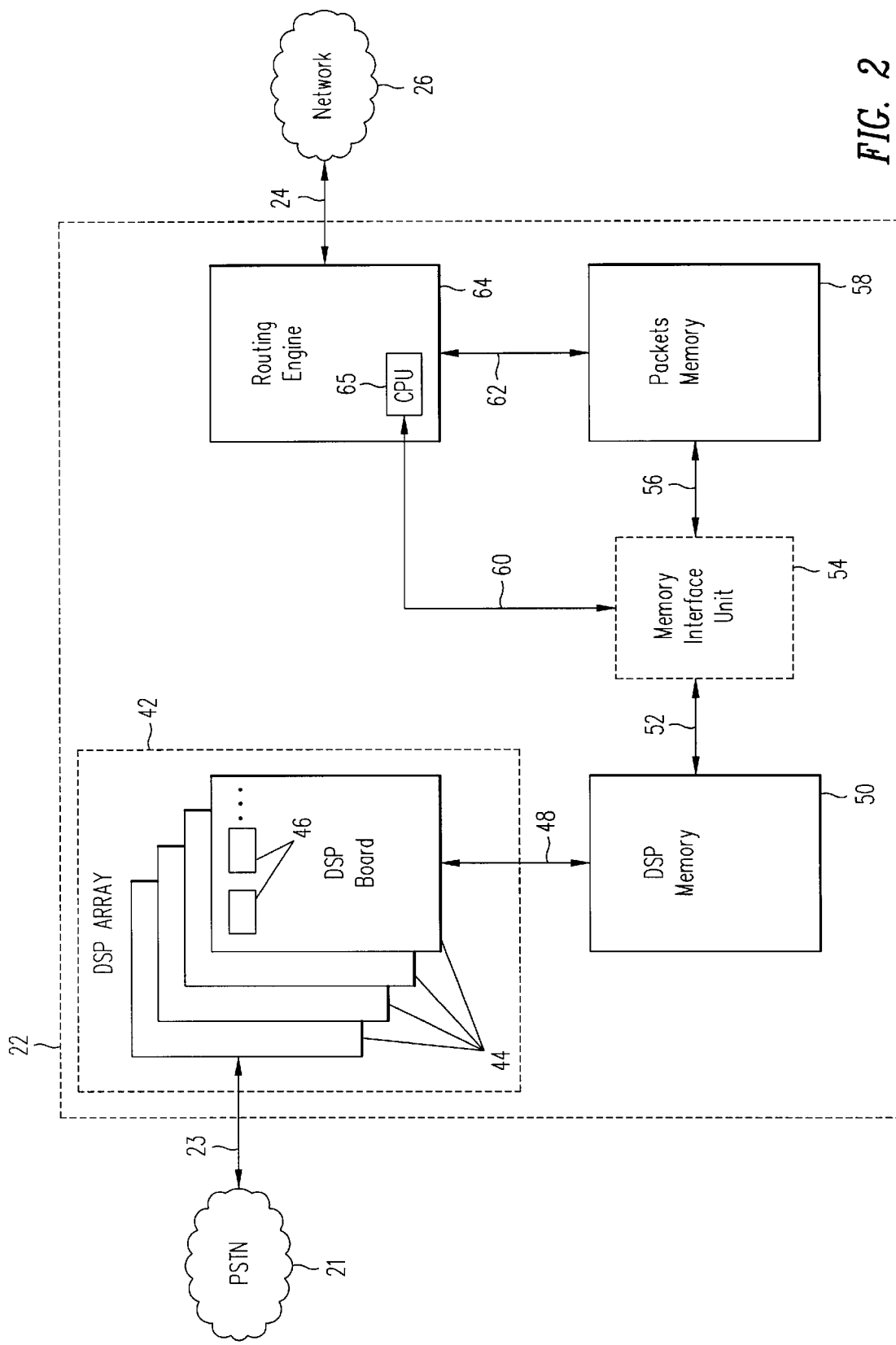

In FIG. 2, the network device 22 is shown to include a DSP array 42 comprising a number of DSP boards 44 each of which includes one or more DSP chips 46. While each of the DSP chips 46 includes memory, such as Random Access Memory (RAM), additional memory, the DSP memory unit 50, is provided for storing various types of information employed by the network device 22, as will be noted shortly. The DSP array 42 is coupled to the DSP memory 50 through a DSP interface 48.

It should be noted that the same internal circuitry and operation shown and discussed with respect to the network device 22 applies to the network device 30 (in FIG. 1).

The DSP memory 50 is further coupled to the memory interface unit 54 via the DSP memory interface 52. The network device 22 is further shown in FIG. 2 to include a routing engine 64 which includes a Central Processing Unit (CPU) device 65. The routing engine 64 employs and is coupled to a packet memory unit 58 for storing various types of information, as will be discussed shortly. Information stored in the packets memory unit 58 is in the form of digitized packets.

The memory unit 58 is coupled to the memory interface unit 54 through the interface 56 and further coupled to the routing engine 64 through an engine interface 62. The CPU 65 communicates with the memory interface unit 54 through control lines 60.

Voice traffic generated by the telephone unit 12 (in FIG. 1) travels through the PSTN 21 and arrives at the DSP array 42 where it is converted to digitized packets by the DSP chips 46 located on the boards 44. The network device 22 additionally includes electronic components other than those shown in FIG. 2, such as a trunk card (or board), which includes circuitry for converting in-coming analog information, such as voice, on T1 voice channels, to digital information prior to packetizing the same by the DSP chips. Additionally, the trunk card (not shown) includes a CPU for assigning each of the T1 voice channels received through the PSTN 21 to a particular DSP chip.

Typically, there are numerous DSP chips in the DSP array 42. For example, in one embodiment of the present invention, there are 96 DSP chips in the DSP array 42. In other embodiments, many more DSP chips may be utilized. Packets of voice information are stored in the DSP memory unit 50 and transferred to the packets memory unit 58. Once stored in the packets memory unit 58, voice packets are transmitted by the CPU 65 through the network 26.

The present invention allows for processing of numerous telephone calls by storing numerous voice packets corresponding to telephone calls in the packets memory unit 58. The stored voice packets are transferred by the CPU 65 through the network 26 at a time when some number of such packets have accumulated in the packets memory unit 58. Accordingly, the present invention resolves latency issues associated with handling many telephone calls over the Internet.

As noted earlier, new packets of voice information arriving at the DSP array 42 are subsequently stored in the DSP memory unit 50.

In prior art systems, every time a new packet arrives at the DSP memory unit 50, the DSP array 42 sends an interrupt message to the CPU 65 prompting the CPU 65 to fetch the packet from the DSP memory unit 50 and to transfer the fetched packet to the packets memory unit 58. In prior art methods, having a large array of DSP chips, such as 96, results in inefficient transfer method since constant interruptions by the DSP array consume much CPU time preventing the CPU from devoting time to higher-level tasks. This reduces system performance.

The present invention, however, avoids this problem by using the memory interface unit 54 to automate the process of packet information transfer thereby relieving the CPU from the task of moving packet information from the DSP memory unit 50 to the packets memory unit 58. As earlier stated, the DSP devices convert digitized voice information into packets.

Figure 3:
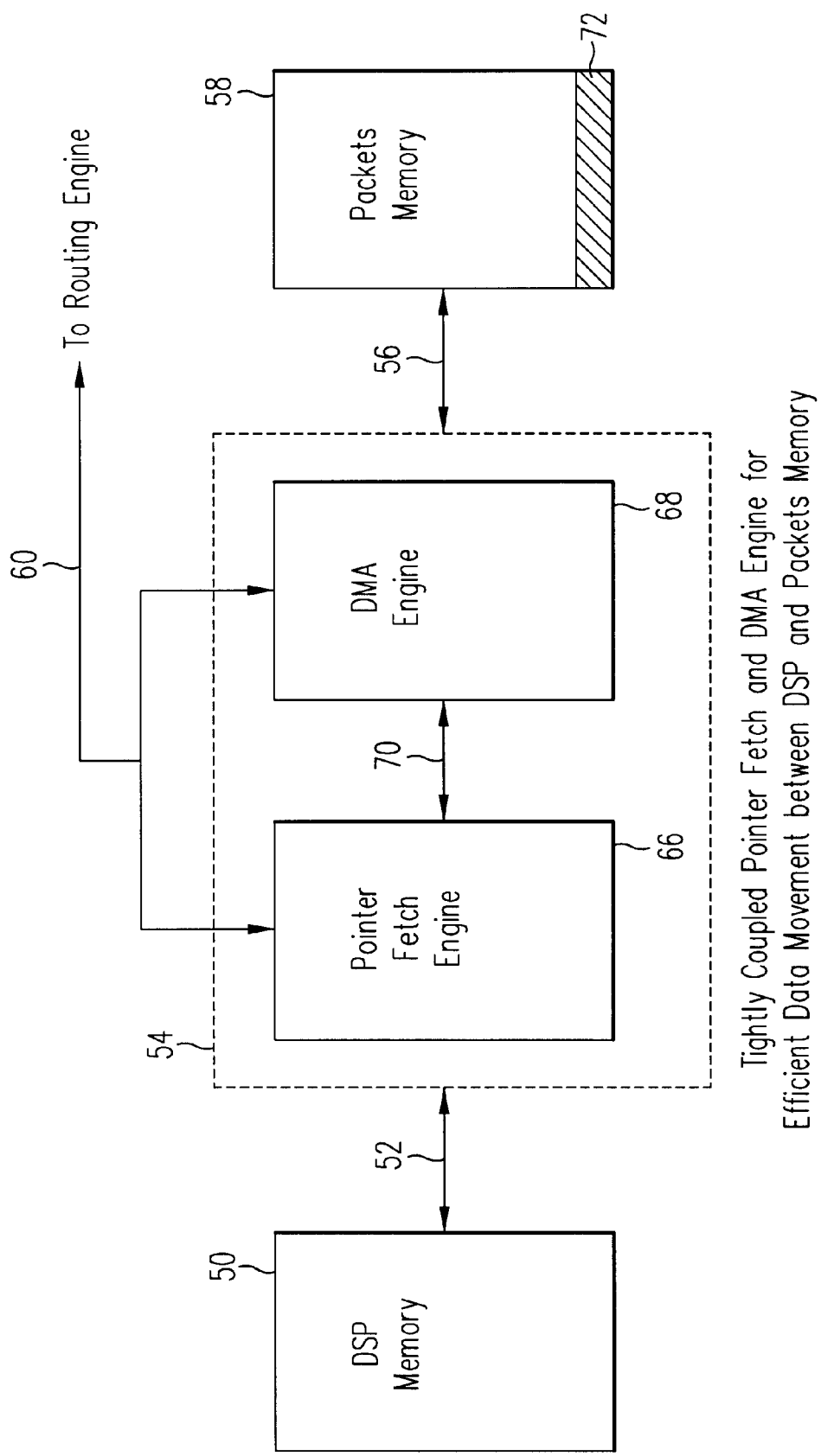

In FIG. 3, the memory interface unit 54 is shown to be connected to the DSP memory unit 50 through the interface 52 and to the packets memory unit 58 through the interface 56. The memory interface unit 54 includes a pointer fetch engine 66 and a DMA engine 68. The pointer fetch engine 66 is coupled to the DMA engine 68 through the interface 70. The CPU 65 (shown in FIG. 2) is in direct communication with both the pointer fetch engine 66 and the DMA engine 68 through the control lines 60. In one embodiment of the present invention, the pointer fetch engine 66 includes one or more commercially-available FPGA (Field Programmable Gate Array) devices (not shown), which are configured to implement the engine 66. The DMA engine 68 could be a commercially-available and off-the-shelf memory access product. For example, a commercially-available part, the PLX9080, may be employed to implement the DMA engine including the interface between the DMA engine and the CPU 65, i.e. the control lines 60. An advantage of using an off-the-shelf product such as the PLX9080 is that it allows for a quick design time leading to a faster entry into the market place. Alternatively, the FPGA design could include the DMA engine.

The memory interface unit 54 is designed to automate the process of transferring voice information packets from the DSP memory unit to the packets memory unit with minimal CPU intervention. This process starts when the CPU 65 (in FIG. 2) initializes the pointer fetch engine 66 through the control lines 60. Subsequently, the pointer fetch engine 66 fetches a set of pointers, corresponding to various DSP chips, from the DSP memory unit 50, through the interface 52, and stores the fetched pointers into the packets memory unit 58. A pointer for a particular DSP chip indicates the address of the location where voice packets utilized by the particular DSP chip are stored in the DSP memory unit 50. In this manner, the CPU 65 determines the location of the new packets which need be moved from the DSP memory unit 50 to the packets memory unit 58. Accordingly, the memory interface unit 54 reduces the tasks performed by the CPU 65 for transferring stored voice packets from the DSP memory unit 50 to the packets memory unit 58 thereby allowing the CPU 65 to tend to higher level tasks. Some of the higher level tasks that the CPU performs include looking into a table for determining the destination Internet Protocol (IP) address to which a packet is to be transmitted and attaching a packet of information received from the DSP device (As earlier stated, the DSP devices convert digitized voice information into packets) into an Internet Protocol packet. Transmission of packets over the Internet is generally performed pursuant to an industry-adopted protocol, referred to as the Transmission Control Protocol/Internet Protocol (TCP/IP).

The pointer fetch engine 66 stores the pointers in a reserved area of the packets memory unit 58, the descriptor 72. The CPU uses the information in the descriptor 72 first to program the DMA engine through the lines 60. Once initialized, the DMA engine moves the packets of information between the DSP memory unit 50 and the packets memory 58.

The interface 52 between the DSP memory unit 50 and the memory interface unit 54 operates at rates considered by the industry-at-large to be relatively slow. For example, in one embodiment of the present invention, the interface 52 (serving the entire array of DSPs) operates at 100 Mbits/sec which is slow compared to the speed at which the packet memory interface 56 operates, i.e. 800 Mbits/sec. Revisiting some of the problems associated with prior art systems, in the case where the CPU directly transfers information from the DSP array, due to the speed incompatibility between the DSP array and the CPU, the latter must wait prior to transferring information from the former, which adversely affects the CPU's performance and available bandwidth. In this connection, the CPU is prevented from supporting many DSP chips. Where the CPU cannot support many DSP chips, less than all packets of information will be processed resulting in certain packets being discarded off, e.g. loss of information.

FIG. 4 shows an example of the organization of information stored within the DSP memory unit 50 and the packets memory unit 58. In FIG. 4, data in both memory units is organized as a queue or first-in-first-out (FIFO). FIFO is a particular type of memory operating in a manner such that the first unit of information (in this case a packet) that arrives is the first packet that is transmitted and so on. In FIG. 4, a number of packets, packet 1, packet 2, packet 3, packet 4 and so on, are shown to be stored in the packets memory unit 58.

The DSP memory unit 50 is shown to be organized into two parts, a payload queue 76 for storing packets of voice information and a pointer table 74 for storing addresses identifying the location of the most recent packets in the payload queue 76. As the reader is reminded, the DSP array 42 comprises many DSP chips. Each DSP chip is assigned a number of transmit (TX) pointers and a number of receive (RX) pointers within the pointer table 74. In the example of FIG. 4, each DSP chip is assigned two TX pointers and two RX pointers in the pointer table 74. It should be noted, however, that other ways of identifying information within the payload queue 76, some of which will be discussed hereinbelow, may be utilized, with or without the use of pointers, without departing from the scope and spirit of the present invention.

The operation of the DSP memory unit 50 is perhaps best understood by the use of an example. Consider the case where the DSP chips, known as DSP 1, DSP 2 and so on, and receiving data from the PSTN. The first time a voice packet provided by DSP 1 (through the interface 48 in FIG. 2) is stored in a predetermined location or storage space within the payload queue 76, the address of the predetermined location is stored (or updated) in the DSP1 RX Insert Ptr 82. This updating indicates that there is new information within the memory—payload queue 76—of DSP memory unit 50. The first time information (or voice packet) is removed from the DSP memory unit 50 by the DMA engine 68, the DSP1 RX Remove Ptr 84 is updated to indicate wherefrom, in the payload queue 76, the information was removed. Thereafter, every time information is stored in the DSP memory unit 50, the insert pointer corresponding to the DSP that is receiving voice packets is incremented by one and when information is removed from the DSP memory unit 50, the remove pointer corresponding to the same DSP is increased by one so that the difference between the insert pointer and the remove pointer of any given DSP chip suggests that new information has been received by that particular DSP chip.

The RX pointers in 82 and 84 in FIG. 4 indicate that information is transmitted from the DSP memory 50 to the packets memory 58. The path of communication in FIG. 2 may be reversed so that information flow is from the network 26 to the PSTN 21. In this path, the DSP memory unit 50 would be receiving information and the TX pointers (as opposed to the RX pointers) in the pointer table 74 are updated. For instance, a DSP1 TX Insert Ptr 78 is updated when new information (voice packet) is received by the DSP 1 from the packets memory unit 58 and the DSP1 TX Remove Ptr 80 is updated when information is removed from the DSP memory unit 50 (the payload queue 76) for transfer through the PSTN 21.

Before the DMA engine 70 transfers any information from the payload queue 76, the pointers in the pointer table 74 are fetched by the pointer fetch engine 66 in order for the CPU 65 to determine which DSPs have new information and need to be serviced. The pointer fetch engine 66 transfers all of the pointers from all of the DSPs into the descriptor 72. The CPU then scans all the pointers looking for mis-matches between the DSPs' respective insert and remove pointers and sets up a chained DMA operation accordingly. This results in a very fast lookup with low overhead. A mismatch between the pointers of a DSP indicates the need to transfer new packets to or from the DSP memory 50. The pointer fetch engine, under the command of the routing engine, fetches all of the Remove and Insert pointers from the DSP memory 50. These pointers are stored in the reserved area of the packets memory unit, the descriptor 72, in FIG. 4. While the discussion so far has been regarding the pointer fetch engine fetching and transferring the pointers, alternatively the CPU may perform such tasks.

Not all of the DSP chips 46 (in FIG. 2) may have new packets to be transferred at any one time. In the example provided hereinabove where a total of 96 DSP chips are employed, 30 may have new packets. The CPU sets up a chain of numbers consisting of 30 entries each of which correspond to a DSP number, i.e. DSP 1, DSP 2, etc. containing new information. As an example, the first entry in the chain may correspond to DSP 5 and the 30th entry may correspond to DSP 88 containing new information. This chain, referred to as the DMA chain, is stored in the DMA engine. When the CPU programs the DMA engine, the latter transfers information only from those DSP chips which have entries in the chain.

The way in which the pointers of the pointer table 74 are described in the example of FIG. 4 is known as a ring structure. Another way of achieving similar outcome with respect to the use of pointers indicative of the status of the information stored in the payload queue 76 is known as random access with descriptors. In this manner, the DSP chip sends a descriptor (or a pointer), the descriptor is read by the DSP array and the packet of information is located within the payload queue in accordance with the value of the descriptor. Other ways of implementing pointers, known to those of ordinary skill in the art, for use in locating packets within memory may be employed.

FIG. 5 depicts the various steps performed by the CPU 65 (shown in FIG. 2) in accordance with an embodiment of the present invention. At step 86, the CPU 65 kicks off, or initiates, the pointer fetch engine 66 (shown in FIG. 3). The CPU 65 begins searching for any new information in the DSP memory by identifying any mismatch in the pointer table 74 between the insert pointers and the remove pointers. At step 88, all pointers of the DSP array are fetched from the pointer table 74 by the pointer fetch engine 66 and stored in the descriptor 72 of the packets memory. At step 90, the CPU 65 programs the DMA chain based on the information provided by the pointers.

When programming of the DMA chain is completed, the CPU kicks off the DMA engine and the latter moves all the packets in the payload queue 76 of the DSP memory unit as specified in the DMA chain and shown in step 92. The DMA engine has information regarding the location of these packets because of the pointers which were obtained by the pointer fetch engine previously and stored in the descriptor 72. When all requisite information is transferred from the payload queue, this round of data transfer ends at step 94 until the next round when the CPU again kicks off the pointer fetch engine in step 86.

Once the DMA engine is kicked off by the CPU, the transfer of information is performed by the DMA engine in channel fashion and the CPU is free to perform other tasks. The advantage of this approach is that the DMA engine is directed to transfer information only from those DSP chips which have received new voice packets thereby making the process of transferring information much more efficient.

In one embodiment of the present invention the interface 52 coupling the DSP memory and the invented entities operates at a peak value of 100 Mbits/sec whereas the interface 56 coupling the invented entities and the packets memory operates at a peak value of 800 Mbits/sec. The interface 62 coupling the packets memory and the routing engine operates at a fast speed of 3.2 Gbits/sec. Given the slow speed of the interface 52, which serves all of the DSP chips, if the CPU were to directly transfer information out of the DSP memory 50, as is currently done, it would have to wait for a long time before all the data is transferred preventing the CPU from performing other necessary high level tasks. The present invention makes the transfer of data much more efficient by automating it through the interaction of the memory interface unit 54 with the packets memory unit 58 and at the same time allows the CPU enough time to perform other tasks.

Each DSP chip is capable of supporting multiple voice channels. In one embodiment of the present invention, each voice channel is referred to as a Digital Signal Level 0 (DS0). A DS0 channel is a single 64 Kbit/sec voice channel carried on, for example, a T1 line, which is capable of carrying 24 channels. Each DS0 channel carries a voice call that is placed through the DSP which carries the voice channel. In this embodiment of the present invention there are two DS0s per DSP chip. Thus, in the example where 96 DSP chips are employed, up to 192 voice channels can be supported. As compared to prior art methods where only 30 voice channels can be supported, the present invention increases the voice channel capability by 6.4 times. It is expected that using an embodiment of the present invention as many as four DS0s per DSP chip or a total of 384 voice channels could be supported which would increase the speed of the data transfer by more than 10 times over prior art methods and apparatus.

Although the present invention has been described in terms of specific embodiments it is anticipated that alterations and modifications thereof will no doubt become apparent to those skilled in the art. It is therefore intended that the following claims be interpreted as covering all such alterations and modification as fall within the true spirit and scope of the invention.

What we claim is:

1. A network device for establishing communication between a first communication unit and a second communication unit through a packet switching network comprising:

a DSP array responsive to signals having coupled thereon voice, fax or data information for digitizing the information and converting the same to packets to form digitized packets of information;

a routing engine for transmitting the digitized packets through the packet switching network;

a DSP memory coupled to the DSP array for storing said digitized packets;

a packets memory coupled to the routing engine for storing a plurality of said digitized packets for transfer thereof to the routing engine; and a memory interface unit coupled between the DSP memory and the packets memory for consummating the transfer of the digitized voice packets from the DSP memory to the packets memory for transfer thereof to the routing engine and accumulating a predetermined number of the digitized packets in the packets memory prior to effectuating the transfer to the routing engine, wherein minimal intervention for transmitting the digitized packet is required by the routing engine thereby allowing the routing engine to tend to higher level tasks resulting in a reduction in system latency.

2. A network device as recited in claim 1 wherein the DSP array is coupled to receive a plurality of telephone channels.

3. A network device as recited in claim 2 wherein the DSP array includes a plurality of DSP boards, each DSP board including one or more DSP chips, each DSP chip being assigned to digitize signals carried over one or more of the plurality of telephone channels.

4. A network device as recited in claim 3 wherein the memory interface unit includes a pointer fetch engine coupled to the DSP memory for fetching a set of pointers from the DSP memory, each pointer corresponding to a DSP chip and for storing the fetched pointers in the packets memory, each pointer being indicative of the address of the stored digitized packets within the DSP memory of the corresponding DSP chip.

5. A network device as recited in claim 4 wherein the memory interface unit further includes a DMA engine coupled to the CPU and the packets memory for effectuating transfer of a large number of digitized packets from the DSP memory to the packets memory.

6. A network device as recited in claim 5 wherein the DSP memory further includes storage space for storing a pointer table and a payload queue for storing the digitized packets, the pointer table for storing at least two pointers for each DSP chip and upon detection of a mismatch between the two pointers, the CPU directing the DMA engine to corresponding digitized packets stored within the payload queue, as indicated by the pointers of the pointer table wherefrom stored digitized packets are transferred to storage locations within the packets memory.

7. A network device as recited in claim 6 wherein the packets memory includes a storage location, a descriptor, for storing fetched pointers from the pointer table and transferring the same to the DSP memory to the descriptor of the packets memory.

8. A network device as recited in claim 7 wherein the CPU for further transferring the digitized packets between the packets memory and the IP packet-switching network at a substantially rapid rate so as to minimize system latency.

9. A network device as recited in claim 1 wherein the digitized packets are voice packets associated with telephone calls.

10. A network device as recited in claim 1 further including a first interface for coupling said DSP memory to said memory interface unit and a second interface for coupling said memory interface unit to the packet memory, wherein the rate of transfer of information through said second interface is substantially faster than the rate of transfer of information through said first interface.

11. A method for establishing communication between a first communication unit and a second communication unit through a packet switching network comprising:

receiving analog communication information for rapid transfer thereof through the packet switching network;

converting the received analog information into digital format;

transforming the converted information into digitized packets of information;

storing the digitized packets into a payload queue storage location;

transferring the digitized packets into storage locations of a packets memory for rapid transfer therefrom through the packet switching network;

accumulating a predetermined number of digitized packets in the packets memory prior to transfer of the digitized packets to the routing engine;

transferring the stored digitized packets from the packets memory to the routing engine for transmission thereof through the packet switching network; and transmitting the transferred stored digitized packets from the routing engine to the packet switching network, wherein minimal intervention is required by the routing engine allowing the routing engine to tend to higher level tasks thereby reducing system latency.

* * * * *

UNITED STATES PATENT AND TRADEMARK OFFICE
CERTIFICATE OF CORRECTION

PATENT NO. : 6,567,400 B1
DATED : May 20, 2003
INVENTOR(S) : Liping Zhang and Indrajit Rajeev Vergis Gajendran It is certified that error appears in the above-identified patent and that said Letters Patent is hereby corrected as shown below:

<u>Title page,</u>
Item [73], Assignee, replace "Cisco Systems, Inc." with -- Cisco Technology, Inc. --.

Signed and Sealed this

Twenty-first Day of October, 2003

JAMES E. ROGAN
*Director of the United States Patent and Trademark Office*